United States Patent
Mueller et al.

(10) Patent No.: US 6,677,049 B2
(45) Date of Patent: Jan. 13, 2004

(54) MULTI-LAYERED, BIAXIALLY-ORIENTED POLYESTER FILM WITH AN OPTIMIZED ELECTRICAL CONDUCTIVITY OVER ITS TOTAL THICKNESS

(75) Inventors: Harald Mueller, Taunusstein (DE); Ursula Murschall, Nierstein (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/938,931

(22) Filed: Aug. 24, 2001

(65) Prior Publication Data

US 2003/0064236 A1 Apr. 3, 2003

(30) Foreign Application Priority Data

Sep. 15, 2000 (DE) .......................... 100 45 604

(51) Int. Cl.[7] .................. B32B 27/08; B32B 27/36; B32B 31/16; B32B 31/30
(52) U.S. Cl. ................. 428/480; 428/212; 428/910; 264/173.11; 264/173.16; 264/288.4; 264/290.2
(58) Field of Search ................. 428/480, 910, 428/212; 264/289.3, 288.4, 290.2, 211.12, 173.16, 173.15, 173.11

(56) References Cited

U.S. PATENT DOCUMENTS

| 5,733,584 A | | 3/1998 | Appelt | |
|---|---|---|---|---|
| 5,833,905 A | * | 11/1998 | Miki | 264/211.12 |
| 5,993,958 A | * | 11/1999 | Okutsu | 264/280 |
| 6,042,773 A | * | 3/2000 | Teramoto et al. | 264/211 |
| 6,361,734 B1 | * | 3/2002 | Miki | 424/400 |

FOREIGN PATENT DOCUMENTS

| DE | 94 02 027 U1 | 7/1995 |
|---|---|---|
| EP | 0 502 208 A1 | 9/1992 |

OTHER PUBLICATIONS

Schimtz, Peter et al., "Films." Ullmann's Encyclopedia of Industrial Chemistry, 5th Ed., vol. A11, pp. 85–94.*

* cited by examiner

Primary Examiner—Vivian Chen
(74) Attorney, Agent, or Firm—ProPat, L.L.C.

(57) ABSTRACT

The invention relates to a multi-layered biaxially-oriented film, mainly made of a crystallizeable thermoplastic polyester and economically produceable with a high surface quality, i.e. without pinning bubbles and without electric arcing and film breaks, at production speeds of 340 m/min or higher. According to the invention the multi-layered polyester film has an average specific electrical melt resistance over its total thickness which lies within a range from $1.5 \times 10^7$ to $30 \times 10^7$ $\Omega \times$cm. The invention also relates to a method of production of the film.

10 Claims, No Drawings

MULTI-LAYERED, BIAXIALLY-ORIENTED POLYESTER FILM WITH AN OPTIMIZED ELECTRICAL CONDUCTIVITY OVER ITS TOTAL THICKNESS

BACKGROUND OF THE INVENTION

1. Field of the Invention

The invention relates to a multi-layered biaxially-oriented film, mainly made of a crystallizeable thermoplastic polyester. The film can be economically produced with a high surface quality and at speeds of more than 340 m/min. The invention also relates to a process for the production of this film.

During the production of multi-layered films with thicknesses lying within the range from 0.5 to 350 $\mu$m plastic granulates are initially melted in extruders, the extruded melts are then led through a multi-layer slot die. The prefilm emerging from the slot die is then placed on a take-off—and quenching roll and, after leaving the take-off roll, longitudinally and transversely stretched in relation to the machine direction.

For the benefit of a stabilized placement of the prefilm on the take-off roll the state-of-the-art technology requires the application of additional forces to the prefilm in the area between the point at which the film exits the flat-film die and the point at which it is placed on the take-off roll. These additionally applied forces can be generated by blowing a stream of air out of an air knife at the prefilm, by spraying water into the nip of the prefilm prior to the point of application on the take-off roll, by producing a water film on the take-off roll, or by generating an electrical field by means of an electrode under high tension, with the field lines of the electrical field being directed towards the surface of the take-off roll. The additionally applied forces serve the purpose of removing the air which is enclosed between the surface of the take-off roll and the bottom side of the prefilm, i.e. that side of the prefilm facing the take-off roll, and which is underneath the nip of the prefilm, prior to placing the prefilm on the take-off roll, in order to obtain a stabilized placing of the prefilm on the surface of the roll by means of a given wrap angle. If this cannot be acomplished, enclosures of air of a more or less voluminous nature, so-called pinning bubbles, may result, which can be found between the bottom side of the prefilm and the surface of the take-off roll, adversely affecting the smoothness of the surface and, thus, the quality of the prefilm previously cooled down on the take-off roll, and subsequently the quality of the biaxially-stretched film manufactured from it.

2. Description of the Related Art

It is known that as an electrode a high-grade steel blade can be parallelly arranged to the surface of the take-off roll. For this purpose a 10 mm-wide portion of the steel blade is usually punched out or cut out from a metal blade which has a thickness of about 20 $\mu$m.

The german utility model G 9402027 describes a device for the production of films, especially thin films or thinnest films by means of a rotating roll, with which a plastically formable film, previously fed into a slot die, is transported and stretched. Between the roll and a steel band parallely arranged to the roll at a short distance, electrical tension is applied by which the film is placed on the roll. The steel band in this known device has a sharp longitudinal edge which is arranged right next to the roll and pointed directly to it. This sharp edge is, similar to a cutting edge, arranged at the tapered area of the steel band, which is hereby arranged right next to the roll at a distance of less than 6 mm. The center line of this tapered area is directly pointed towards the center point of the roll. The use of such a steel band electrode helps to improve the quality of the film.

As the final speed during the film production is increased to a value of more than 340 m/min, an increased amount of pinning bubbles can be noticed. Increasing the electrical tension can counteract this development to a certain degree, but if the tensions applied are too high, electric arcing between the electrode and the quenching roll is the result. This leads to a severe defect within the film in the area affected by these arcings, namely an extremely thin area extending over the width of the film. As a result the film breaks within the machine, which is extremely unfavourable from an economical point of view. The procedural window for the production safety in the relation between pinning bubbles and electric arcing with film breaks gets smaller and smaller as the production speed is increased.

SUMMARY OF THE INVENTION

It was the object of this invention to produce a multi-layered, biaxially-oriented polyester film with a thickness lying within the range from 1 to 20 $\mu$m at speeds of 340 m/min or more assuring a procedural window of a sufficient size for the production stability during the manufacturing process.

This object is achieved by the using a kind of film as previously mentioned, wherein the average specific electrical melt resistance over the total thickness of the multi-layered polyester film lies within the range from $1.5 \times 10^7$ to $30 \times 10^7$ $\Omega \times$cm, preferably from $2 \times 10^7$ to $10 \times 10^7$ $\Omega \times$cm, especially preferred from $3 \times 10^7$ to $6 \times 10^7$ $\Omega \times$cm.

The average specific melt resistance over the total thickness [$\rho$] (rho) is the arythmetical average of the specific electrical resistances of the individual layers based on the thicknesses of the individual layers.

For a three-layered ABC-film the following formula applies $$\rho = \rho_A \cdot \frac{d_A}{d_{ges}} + \rho_B \cdot \frac{d_B}{d_{ges}} + \rho_C \cdot \frac{d_C}{d_{ges}}$$

$d_A$, $d_B$, $d_C$: thickness of the individual layers
$d_{ges} = d_A + d_B + d_C$: total thickness
$\rho_A$, $\rho_B$, $\rho_C$: specific electrical resistance of the individual layers During the production of films with thicknesses of 1 to 20 $\mu$m at final speeds of 340 m/min or more under electrical tension, a dramatically high amount of pinning bubbles is the result every time polyester raw material with an average specific electrical melt resistance over its thickness of more than $30 \times 10^7$ $\Omega \times$cm is used. Increasing the electrical tension slightly reduces, but does not eliminate the forming of pinning bubbles, since this in turn leads to an increased amount of electric arcing.

If, however, the average specific electrical melt resistance over the thickness is below $1.5 \times 10^7$ $\Omega \times$cm, the previously described problems do reoccur whenever production speeds are high.

It was completely surprising that biaxially-oriented polyester films produced with a thickness of 1 to 20 $\mu$m at final speeds of 340 m/min or more could be manufactured without pinning bubbles and free of electric arcing if its average specific electrical melt resistance [$\rho$] over the total thickness of the film is within the range from $1.5 \times 10^7$ to $30 \times 10^7$ $\Omega \times$cm according to the invention.

The manufactured films are multi-layered. They can have a symmetrical or an unsymmetrical structure, wherein differently composed polyesters, respectively composed or non-composed polyesters, or polyesters of the same chemical compound but with a different molecular weight and a different viscosity are combined by way of coextrusion.

The film according to the invention mainly consists of crystallizeable polyethylene terephthalates, of crystallizeable polyethylene naphthalates (PEN), or mixtures thereof.

Crystallizeable polyethylene terephthalate or crystallizeable polyethylene naphthalate means
- crystallizeable homopolymers
- crystallizeable copolymers
- crystallizeable compounds
- crystallizeable recycled material
- other variations of crystallizeable polyester.

Polyesters can either be produced according to the ester interchange process, e.g. catalyzed by ester interchange catalysts such as Zn—, Mg—, Ca—, Mn—, Li—, or Ge—salts, or according to the direct ester process (PTA method), where antimone compounds are used as polycondensation catalysts and phosphorus compounds as stabilizers. The IV-value (intrinsic viskosity) of the polyesters preferably lies within the range from 0.5 to 1.0 dl/g.

Examples of polyesters are polycondensates made of terephthalic acid, isophthalic acid or 2,6-naphthalene dicarboxylic acid containing glycols with 2 to 10 carbon atoms such as polyethylene terephthalate, polybutylene terephthalate, poly-1,4-cyclohexylene-dimethyleneterephthalate, polyethylene-2,6-naphthalene dicarboxylate, polyethylene naphthalate/bibenzoate or polyethylene-p-hydroxy-benzoate.

The polyesters can be made of comonomer units of up to 50 mol %, especially of up to 30 mol %, whereby a variation of the glycol- and/or acid component is possible. Among others the copolyesters can contain as acid components 4,4'-bibenzoic acid, adipic acid, glutaric acid, succinic acid, sebacic acid, phthalic acid, isophthalic acid, 5-Na-sulfoisophthalicacid orpolyfunctional acids such as trimelitic acid.

The polyester films can be produced, according to known methods, of a polyester raw material, optionally containing additional raw materials and/or further additives customarily used for making carrier films for magnetic recording media at usual quantities of 0.1 to a maximum of 20% by weight, as multi-layered, optionally coextruded films with either equally or differently structured surfaces, wherein, for example, one surface can be pigmented, and the other surface contains less pigments or no pigments at all. In that manner one or both film surfaces can be provided with a customary functional coating in accordance with known methods.

The preferred extrusion method for the production of the polyester film comprises coextruding the melted polyester layers through a slot die and chilling it as a mainly amorphous prefilm on a quenching roll with a polished surface. This film is reheated thereafter and stretched in the machine direction (=MD) and in the transverse direction (=TD), respectively in TD and in MD, respectively in MD, in TD and again in MD and/or in TD. The stretching temperatures are generally within the range from $T_g+10$ K to $T_g+60$ K ($T_g$=glass transition temperature). The length stretch ratio is usually within the range from 2 to 6, especially from 3 to 4.5, the transverse stretch ratio is within the range from 2 to 5, especially from 3 to 4.5, and the ratio of the optionally performed second length stretching is within the range from 1.1 to 3. As an option the first length stretching can be simultaneously performed with the transverse stretching (simultaneous stretching). This is followed by the thermo-fixing of the film at oven temperatures lying within the range from 150 to 250° C, especially from 170 to 240° C.

The speed of the film upon arrival at the winding machine is 340 m/min or more.

The fact that the film can be produced at high speeds, without electric arcing and free of pinning bubbles makes the production very economical. Due to its high quality the film is suitable for highly sophisticated applications, for example as carrier film for magnetic recording media, high-quality wrapping films, capacitor films, films for applications in the metallizing field, to name just a few.

The measurement of the individual properties is performed in accordance with the following standards, respectively methods.

Specific Electrical Melt Resistance

The specific electrical melt resistance is determined according to the method by Brit. J. Appl. Phys. Volume 17, pages 1149–1154 (1966). The temperature of the melts (measuring temperature) is 285° C. and the resistance is observed immediately after applying a tension of 100 V.

Average Thickness

The average thickness $d_F$ of a film is determined by its weight based on a given length, width and density. To be measured is the weight of a film strip prepared on the cutting table, taken from the middle of a sample which extends across the entire width of the roll. The value $d_F$ is then determined by the following formula:

$$d_F(\mu m) = \frac{m[g]}{l[mm] \cdot b[mm] \cdot d[g/cm^3]} \cdot 10^6$$

with the following applying:

m=mass of the piece of film l=length of the sample b=width of the sample d=density of the examined material d=1.395 g/cm³ for polyester After the individual sample strips have been cut, their weight is determined by an analytical scale, type Mettler PM 200 (maximum weight 200 g). A computer type HP Vectra ES/12 connected to the scale determins the average thickness, based on all the necessary parameters.

IV-value (DCE)

The standard viscosity SV (DCE) is measured, according to DIN 53726, in dichloro acetic acid.

The intrinsic viscosity (IV) is determined, based on the standard viscosity, as follows:

$IV(DCE)=6.67\times10^{-4}\ SV(DCE)+0.118.$

Pinning Bubbles

In order to examine the film for pinning bubbles a 10 cm-wide film strip is analyzed while being led over the entire width of the original roll past the monochromatic light of a sodium arc lamp (wave length 590 nm) in front of a black background. The pinning bubbles at the surface of the film are then transmitted with a 120-fold magnification to a screen via a video camera and assessed.

A film free of pinning bubbles has a homogenous unstructured surface. A film with pinning bubbles looks slightly dull and has a surface covered with an innumerable number of the smallest of bubbles (spots). The number of bubbles, respectively spots, is≧5000 per 100 cm² of film.

EXAMPLE 1

By way of coextrusion technology a three-layered ABA film was produced, with B representing the base layer with a thickness of 11 μm and A representing the cover layers, with a thickness of 1 μm each, arranged on both sides of base layer B.

The polyethylene terephtalate (PET) for the base layer had a SV-value of 810 and a specific electrical melt resistance of 0.9×107 Ω×cm (FL2CV, Toray, France). For the cover layers the polyester 4020 of KoSa, Germany, was used, which was provided, by way of masterbatch technology, with an amount of 5000 ppm of $CaCO_3$-particles with an average particle diameter of 0.7 μm, measured according to the sedigraph method, and which had a specific electrical melt resistance of $32×10^7$×Ω×cm. The final speed during the film production was approximately 400 m/min. The tension applied to the electrode was 5.8 kV. The length-stretch ratio was 4.6.

Thus, the average specific electrical melt resistance of the film over its total thickness was $[ρ]=5.7×10^7$×Ω×cm. No pinning bubbles did develop, nor was there any electric arcings, which could have led to film breaks. The running stability at such a high production speed was good.

COMPARATIVE EXAMPLE 1

Example 1 was repeated. In contrast to Example 1, however, the PET raw material FL2CV with a specific melt resistance of $0.9×10^7$ Ω×cm was also used in the cover layers. At production speeds of 350 m/min it was impossible, regardless of the tension setting used, to place the melt film emerging from the slot die on the quenching roll without pinning bubbles developing and without electric arcing occuring, which finally led to film breaks. The average specific electrical melt resistance of the melts for the film over its total thickness after performing the example was $[ρ]=0.9×10^7$×Ω×cm.

COMPARATIVE EXAMPLE 2

Example 1 was then repeated. In contrast to example 1 the PET raw material 4020 of KoSa with a specific melt resistance of $32×10^7$ Ω×cm was used for the base layer and the two cover layers. At a production speed of 330 m/min or more it was no longer possible, regardless of the tension setting used, to place the film without pinning bubbles developing and without electric arcing occuring, which led to film breaks in the end. The average specific electrical melt resistance of the film over its total thickness after performing example 2 was $[ρ]=32×10^7$×Ω×cm.

average specific electrical melt resistance (ρ) over the total thickness being $$η=Ση_i(d_i/d_{total}),$$

wherein $η_i$ being the specific melt resistance of one layer (i), $d_i$ being the thickness of said one layer (i), and $d_{total}$ being the total thickness of the film.

2. Multi-layered film, as claimed in claim 1, wherein the average specific electrical melt resistance over its total thickness is within a range from $2×10^7$ to $10×10^7$ Ω×cm.

3. Multi-layered film, as claimed in claim 1, wherein the average specific electrical melts resistance over its total thickness is within a range from $3×10^7$ to $6×10^7$ Ω×cm.

4. Film, as claimed in claim 1, wherein the film is two-layered, three-layered or multi-layered and at least one layer is not the same as another layer.

5. Film, as claimed in claim 1, wherein the film mainly consists of a crystallizeable polyethylene terephthalate, of a crystallizes le polyethylene naphthalate, or of mixtures thereof.

6. Multi-layered film, as claimed in claim 1, where n the film additionally contains antimony compounds as polycondensation catalyst and phosphorus compounds as stabilizers, and wherein the IV value of the polyesters is within the range from 0.5 to 1.0 dl/g.

7. Process for the production of a film as claimed in claim 1, which comprises extruding the melted polyester layer through a flat-film die (slot die) and placing them as a mainly amorphous prefilm on a quenching roll with a polished surface for chilling, reheating this prefilm thereafter and stretching it in the machine direction (=MD) and in the transverse direction (=TD), thermofixing and winding it, wherein for a correct placement of the prefilm on the quenching roll an electrical field is used, produced by an electrode, where the magnetic lines of the electrical field are pointed towards the surface of the take-off roll, and wherein the stretching temperature is set to a value lying within a range from $T_g+10$ K to $T_g+60$ K.

8. Process, as claimed in claim 7, wherein the length stretch (MD) ratio is set to a value within a range from 2 to 6, and the transverse stretch (TD) ratio is within a range from 2 to 5.

TABLE 1

|  | IV-value cover-and base layers | Electrical resistance averaged over the thickness [ρ] [Ω × cm] | Length stretch ratio | Final speed [m/min] | Tension applied [kV] | Pinning bubbles | Electric arcing | Running stability |
| --- | --- | --- | --- | --- | --- | --- | --- | --- |
| Example 1 | 0.66 dl/g | $5.7 × 10^7$ | 4.6 | 400 | 5.8 | none | no | good |
| Comparative Example 1 | 0.66 dl/g | $0.9 × 10^7$ | 4.6 | 400 | from 4 to 8 | Placement w/o pinning bubbles impossible | yes | bad |
| Comparative Example 2 | 0.66 dl/g | $32 × 10^7$ | 4.6 | 400 | from 4 to 8 | Placement w/o pinning bubbles impossible | yes | bad |

We claim:

1. Multi-layered biaxially-oriented film consisting essentially of individual layers mainly made of a crystallizable thermoplastic polyester and economically produced at production speeds of 340 m/min and higher, wherein the average specific electrical melt resistance over the total thickness of the multi-layered polyester film is within a range from $1.5×10^7$ to $30×10^7$ Ω×cm and wherein said 9. Process, as claimed in claim 7, wherein the thermofixing of the film is performed at oven temperatures within a range from 150 to 250° C.

10. Process, as claimed in claim 7, wherein the speed of the film when it reaches the winding device for the winding process is set to a value of 340 m/min or higher.

* * * * *